(12) United States Patent
Kuroda et al.

(10) Patent No.: US 6,567,746 B2
(45) Date of Patent: May 20, 2003

(54) MAP INFORMATION PROVIDING APPARATUS AND METHOD

(75) Inventors: Koichi Kuroda, Kanagawa-ken (JP); Takuo Ishiwaka, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/087,847

(22) Filed: Mar. 5, 2002

(65) Prior Publication Data

US 2002/0169548 A1 Nov. 14, 2002

(30) Foreign Application Priority Data

Mar. 22, 2001 (JP) ........................................ 2001-082420

(51) Int. Cl.⁷ ............................................... G01C 21/30
(52) U.S. Cl. ...................... 701/212; 701/35; 701/208; 340/990
(58) Field of Search ........................... 701/35, 23, 208, 701/211, 212; 340/988, 990, 995

(56) References Cited

U.S. PATENT DOCUMENTS 4,608,656 A * 8/1986 Tanaka et al. ............... 701/212
6,121,900 A * 9/2000 Takishita ..................... 340/995

FOREIGN PATENT DOCUMENTS

JP          11-230761          8/1999

* cited by examiner

*Primary Examiner*—Gertrude Arthur
(74) *Attorney, Agent, or Firm*—McDermott, Will & Emery

(57) ABSTRACT

A map information providing apparatus includes a detecting unit 13 and a searching part 21. In operation, the part 21 searches a target object in accordance with a position of a user's vehicle detected by the detecting unit 13. A positional relationship analyzing part 22 analyzes a positional relationship between the target object and the user's vehicle. A reduced scale calculating part 23 calculates a reduced scale of the map information on the basis of the positional relationship analyzed by the part 22 and a display format of an onboard monitor 3. Further, the apparatus picks up the map information with the calculated reduced scale allowing the vehicle and the target object to be displayed on the monitor 3 simultaneously.

13 Claims, 10 Drawing Sheets

(SELECT OF TARGET HAVING NO CONGESTION)

(SELECT OF TARGET ON THE SIDE OF TRAVELING DIRECTION)

(SELECT OF ALL TARGETS ON THE SIDE OF TRAVELING DIRECTION)

MAP INFORMATION PROVIDING APPARATUS AND METHOD

BACKGROUND OF THE INVENTION

1. Field of the Invention

The present invention relates to a map information providing system that provides a user with a map information with a proper reduced scale on the basis of a relationship between the present position of the user and a position of a target object. More in detail, the invention relates to a map information providing apparatus and method both of which can accomplish the above mentioned operation of the system.

2. Description of the Related Art

As means for providing a user with a positional information about a user's destination, Japanese Patent Application Laid-open No. 11-230761 discloses a navigation system that can display a detailed positional information centering a destination established by the user. In the operation, when a destination is clearly designated by the user, this navigation system performs a so called "download" operation to take in a map information of a narrow (or restricted) area arranging the designated destination as a map center. To the contrary, if the position of a user's destination is vague, for example, a situation that a user's destination is designated in the form of "one destination or thereabouts", then the systems loads a map information of a wide area including the destination.

Meanwhile, as to the situation that a user desires to acquire a detailed map information, there can be expected two cases as follows. That is, one case is a situation where the user possesses enough information to specify a destination clearly and therefore, the user wants to reach the destination smooth as possible. Another case is a situation that, for example, a user cannot identify the present position of a user's vehicle since the user misses the user's way and therefore, the user wants to reach a target object for the moment (e.g. interchange for free way) that enables the user to recognize the present position of the user's vehicle.

The above mentioned navigation system disclosed in Japanese Patent Application Laid-open No. 11-230761 can cope with the former case, but the system cannot cope with the latter case. Because an indispensable information for the user in the latter case is not a map in the neighborhood of the user's final destination but a map information illustrating the positional relationship between the user's vehicle and the target object for the moment. To the contrary, since the above navigation system is constructed so as to provide the user with a map information about the user's vehicle or the final destination, it is impossible to cope with such a user's requirement.

In detail with the operation of the above navigation system, there is a possibility that the so loaded map information contains only the position of the user's vehicle but the position of the target object, in other words, both of the positions are not displayed in one picture on a display unit simultaneously. In such a case, the user cannot grasp the positional relationship between the user's vehicle and the target object for the moment (e.g. interchange for freeway) clearly although the user grasps an absolute position of the user's vehicle on map. Then, the user has to again order the system to perform the download operation for taking in a map information with a larger scale.

Additionally, if the user's vehicle is present on an urban street or the like despite that both of the user's vehicle and the target object are displayed on the display unit simultaneously, then the user requires a more detailed map. Also in this case, the user has to again order the system to perform the download operation for taking in a map information with a smaller scale.

In the above way, if the map information is not provided with appropriate area and appropriate reduced scale, then a problem arises in that the user is burdened with superfluous time, excessive communication fee and manipulations.

SUMMARY OF THE INVENTION

Under the above mentioned circumstances, it is an object of the present invention to provide map information providing apparatus and method that calculate an appropriate reduced scale of map, which allows a user's vehicle and a target object for a user's destination to be displayed on an monitor, on the basis of a positional relationship between the user's vehicle and the target object, whereby the user can be provided with a map information having the appropriate reduced scale and also an appropriate area in order to guide the user's vehicle to the target object.

According to the invention, the above mentioned object is accomplished by a map information providing apparatus comprising:

a detecting unit configured to detect a position of a user's vehicle;

a memory unit configured to store information including a map information therein;

a control unit connected to the detecting unit and communicated with the memory unit thereby to select the map information in the circumferences of the position of the user's vehicle detected by the detecting unit; and an onboard display unit connected to the control unit and configured to display the map information selected by the control unit; wherein the map information includes information about target objects forming landmarks on a route for a user's destination; and the control unit comprises:

a searching part configured to search a target object for the moment with reference to the information stored in the memory unit, on the basis of the position of the user's vehicle and information about the user's destination inputted by a user;

a positional relationship analyzing part connected to the searching part and configured to analyze a positional relationship between the target object searched by the searching part and the user's vehicle;

a reduced scale calculating part connected to the positional relationship analyzing part and configured to calculate a reduced scale of the map information to be displayed on the onboard display unit, on the basis of the positional relationship analyzed by the positional relationship analyzing part and a display format of the onboard display unit; and a map information acquiring part connected with both of the reduced scale calculating part and the onboard display unit and configured to acquire the map information with the reduced scale calculated by the reduced scale calculating part, from the memory unit and further transmit the map information to the onboard display unit.

From another aspect of the present invention, there is provided a map information providing method for selecting a map information on the circumstances of a position of a user's vehicle in response to a map information demanding order received from a terminal on the user's vehicle, thereby to display the selected map information on an onboard display unit, the method comprising:

storing a map information including target objects forming landmarks on a route for a destination in advance;

searching a target object for the moment out of the target objects with reference to the map information on the basis of the position of the user's vehicle and information about the destination inputted by a user;

analyzing a positional relationship between the searched target object and the user's vehicle;

calculating a reduced scale of the map information to be displayed on the onboard display unit, on the basis of the analyzed positional relationship and a display format of the onboard display unit; and selecting the map information in accordance with the calculated reduced scale and further transmitting the readout map information to the user's vehicle.

DESCRIPTION OF THE PREFERRED EMBODIMENT

Embodiments of the present invention will be described below, with reference to accompanying drawings.

Figure 1:
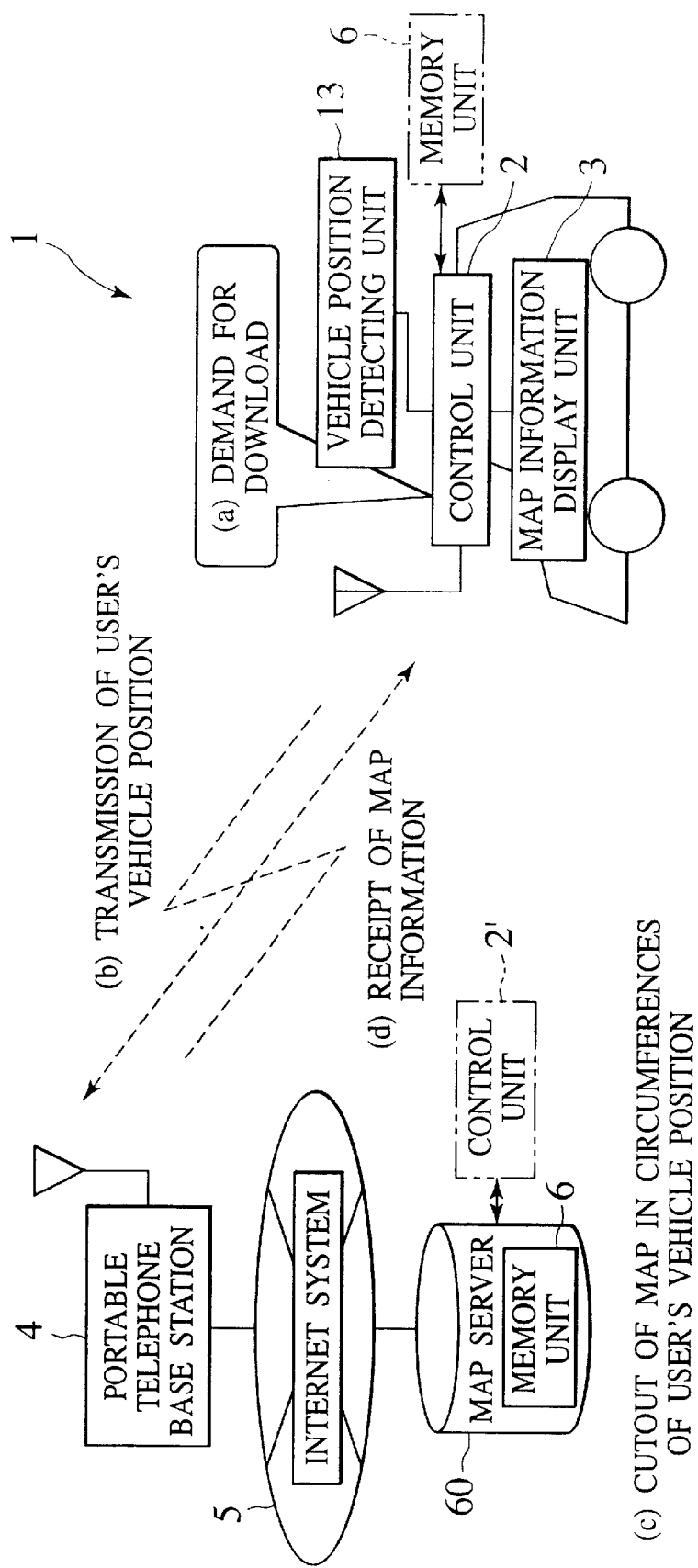
FIG. 1 is a schematic block diagram showing a map information providing apparatus in accordance with an embodiment of the present invention.

Referring now to FIG. 1, we firstly describe the constitution of a map information providing apparatus in common with the embodiments of the invention.

[Overall Structure]

FIG. 1 also illustrates the relationship between a map information providing apparatus 1 of the invention and an outside systems including an internet system 5. The map information providing apparatus 1 includes a user's vehicle position detecting unit 13 for detecting the present position of a user's vehicle, a control unit 2, a map information display unit 3 and a memory unit 6. In operation, the user's vehicle position detecting unit 13 detects the position of the user's vehicle, while the control unit 2 selects a map information in the circumstances of the user's vehicle with reference to map information etc. stored in the memory unit 6. Further, the control unit 2 acquires the so selected map information to display it on the display unit 3.

In one form of the present apparatus 1, the memory unit 6 may be separated from the vehicle and arranged in a map server 60 that the remaining map information providing apparatus 1 (on the side of the user's vehicle) can give access through the intermediary of the internet system 5. In this case, the access to the memory unit 6 in the map server 60 is carried out through a portable telephone base station 4 while using public circuits, movable communication network, etc. Consequently, since there is no need to load a memory unit, a memory media or the like on the side of the vehicle, it is possible for the driver to acquire an information of necessary area as occasion demands.

In this embodiment shown in the figure, the memory unit 6 as a constituent of the map information providing apparatus 1 is arranged in the map server 60 that stores necessary map information.

Together with a "download" command (a) produced in the user's vehicle, an information (b) about the position of the user's vehicle is transmitted to the map server 60 through the portable telephone base station 4 and the internet system 5. By either command signal transmitted from the control unit 6 or activation of a controller (not shown) built in the map server 60, it gathers various map information corresponding to the present position of the user's vehicle. Note, as a constituent of the control unit 2, it may include the built in controller of the map server 60. Then, the map server 60 selects a map information in the circumferences of the user's vehicle from various map information and continuously cuts it out [(c) of FIG. 1]. The so selected map information is transmitted to the apparatus 1 on the side of the vehicle [(d) of FIG. 1] and successively displayed on the display unit 3 connected to the control unit 2.

Figure 2:
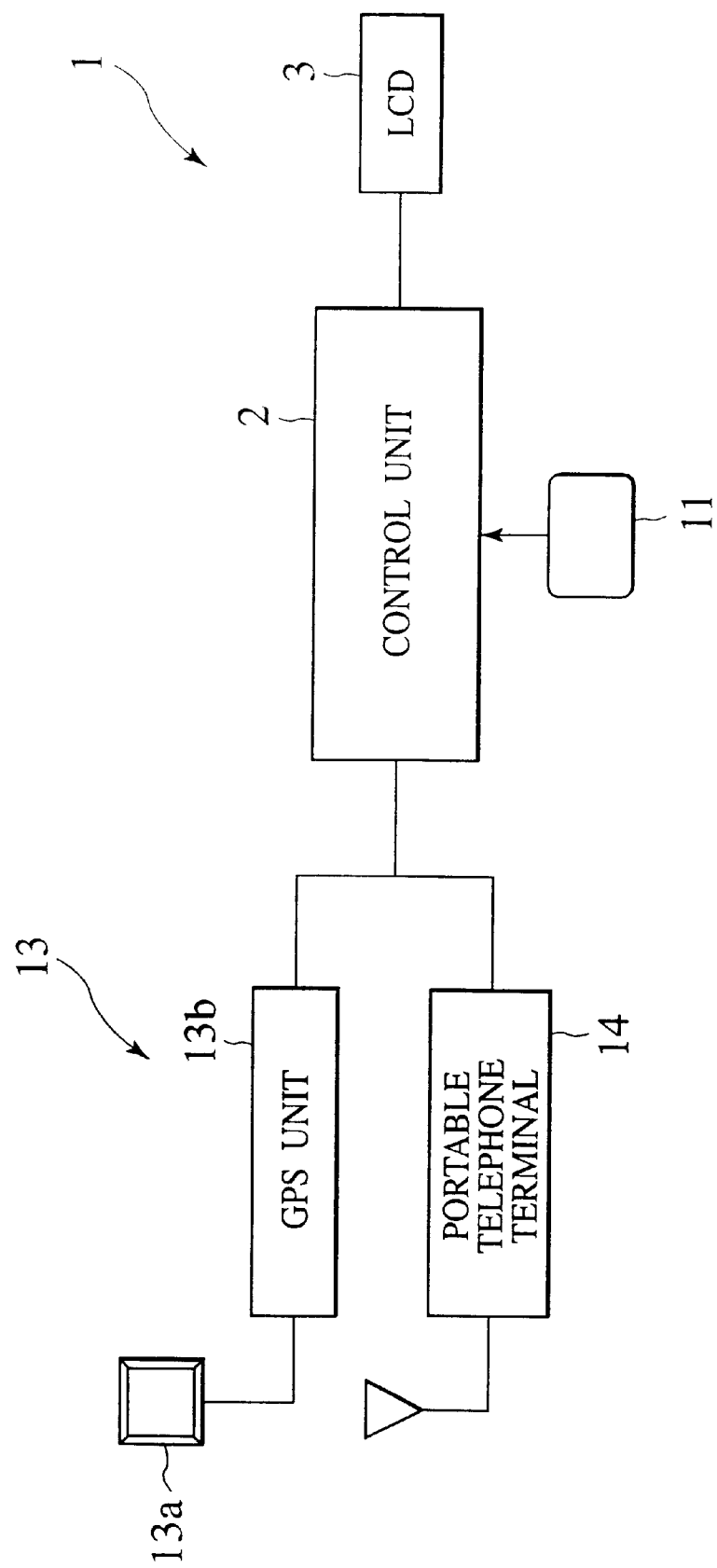
FIG. 2 is a schematic block diagram showing the constitution of the map information providing apparatus on the side of a vehicle.

FIG. 2 shows the structure of the map information providing apparatus 1 on the side of the user's vehicle. On the side of the vehicle, the user's vehicle position detecting unit 13 is formed by a GPS (Global Positioning System) antenna 13a and a GPS unit 13b for processing signals received through the GPS antenna 13a. Although not shown in FIG. 1, this "onboard" map information providing apparatus 1 further includes a terminal 14 for portable telephone that allows the apparatus 1 to give access to the internet system 5 via the portable telephone base station 4 (FIG. 1). The display unit 3 is formed by a LCD (Liquid Crystal Display) unit. The control unit 2 controls various operations of the map information providing apparatus 1, for example, communication with the map server 60, search for map information, calculation of reduced scales and so on. The map information providing apparatus 1 further includes a map information demand button (switch) 11 for transmitting a map information demand signal, namely, the "download" demand from the vehicle to the map server 60.

In operation of the map information providing apparatus 1 of the embodiment, when the map information demand button (switch) 11 is pushed by a driver or the like (e.g. assistant passenger), the control unit 2 is activated and furthermore, both of the information about the present position of the user's vehicle and the above map information demand signal are transmitted to the map server 60.

Note, in the modification where the memory unit 6 is arranged in the vehicle, the above information and signal are transmitted through the intermediary of cables or radio (wireless). To the contrary, in the shown embodiment where the memory unit 6 is arranged in the map server 60 in connection with the internet system 5, the above information and signal are transmitted to the map server 60 through the portable telephone terminal 14.

On receipt of the information, the control unit 2 (or the built in controller of the map server 60) performs the following operations of: searching a target object in the circumferences of the user's vehicle; analyzing the positional relationship between the target object and the user's vehicle; and calculating a minimum reduced scale allowing the target object and the user's vehicle to be displayed on the identical display unit (LCD) 3. Note, at this time, layouts about both margins and direction of map information may be edited in view of the driver's easiness to watch them. Further, the control unit 2 gains an appropriate map information (i.e. map information containing the positions of the user's vehicle and the target object) from the map information with the so calculated reduced scale and further displays the so gained map information on the display unit 3 on board.

[Functional Constitution]

Figure 3:
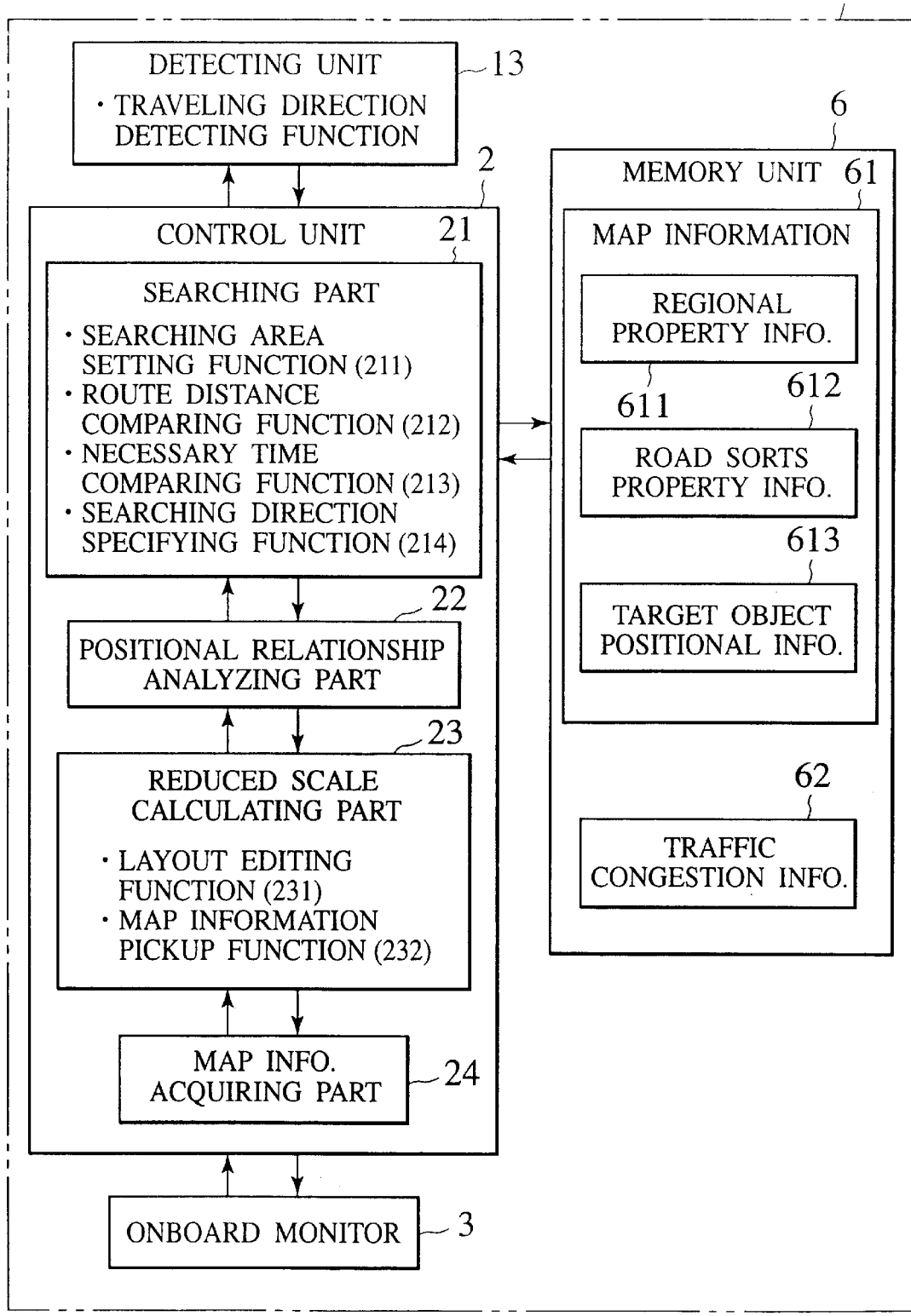
FIG. 3 is a schematic block diagram showing the constitution of a controller of the map information providing apparatus.

FIG. 3 is a block diagram showing the constitution of the map information providing apparatus 1 shown in FIGS. 1 and 2, functionally. In view of functional classification, the map information providing apparatus 1 comprises the detecting unit 13 for detecting the position of the user's vehicle, the control unit 2 for selecting the map information corresponding to the so detected position of the user's vehicle, the display unit (onboard monitor) 3 for displaying the map information and the memory unit 6 for storing the map information. In this figure, the control unit 2 and the memory unit 6 forming the map information providing apparatus 1 are shown as if they were arranged on the side of the user's vehicle. Nevertheless, a part (including the map searching function) of the controller's part 2 may be shifted to the side of the map server 60, as similar to the memory unit 6.

[Detecting Unit]

Repeatedly, the detecting unit 13 detects the present position of the user's vehicle. The user's vehicle position detecting unit 13 of FIG. 1 and the GPS unit 13b of FIG. 2 correspond to the detecting part 13. As this detecting unit 13, there may be employed a car navigation system (not shown) that is generally used to detect the present position of a moving object (e.g. user's vehicle) in the form of absolute positional information of the moving object, providing that a radio wave generated from a position detecting satellite (not shown) is received by the GPS antenna 13a. In the modification, the detecting unit 13 may be formed by a system for measuring the position of the user's vehicle by means of an autonomic navigation where the present position of the user's vehicle is estimated by a cumulative calculating method, on the basis of the positional data inputted by a gyro sensor or a traveling distance sensor attached to a vehicle wheel.

[Control Unit]

The control unit 2 includes a searching part 21, a positional relationship analyzing part 22, a scale calculating part 23 and a map information acquiring part 24. In the shown embodiment, the control unit 2 is arranged on the side of the user's vehicle. Insistently, as shown with broken line of FIG. 1, the control unit 2 may be partially arranged in the map server 60 to which the user can give access through the internet system 5.

Searching Part

The searching part 21 is provided to search a target object in the circumferences of the user's vehicle, corresponding to the present position of the user's vehicle detected by the detecting unit 13. It should be noted that the target object is not a final destination but one of landmarks in the course to the final destination. As the target objects, there are nominated interchanges in freeways, intersections, city offices, institutions such as police boxes (kobans), structures such as bridges, etc. It is preferable that a landmark suitable for the driver is searched as the target object. For this, the map informations comprises a target object positional information 613 about respective positions of the target objects, a regional property information 611 about a relationship between the targets' positions and their regional property information (e.g. urban or rural), a road sorts property information 612 about a relationship between the targets' positions and their road property (e.g. main road, freeway or narrow street), etc.

Corresponding to these informations, the searching part 21 includes a search area establishing function 211, a route distance comparing function 212, a necessary time comparing function 213 and a search direction specifying function 214.

The search area establishing function 211 is a function of the searching part to determine a searching area corresponding to the regional property of the present position of the user's vehicle. For example, when the vehicle is in the rural area, the target object is searched in a wide searching area. While, in the urban area, the target object is searched in a narrow searching area. Thus an appropriate target object in accordance with the regional property is searched.

The route distance comparing function 212 is a function (of the searching part) to select the "substantially nearest" target object to the user's vehicle, from nominated target objects. That is, in accordance with the function 212, it is not executed to calculate respective liner distances between the user's vehicle and the nominates target objects, but executed to calculate respective route distances between the nominated target objects and the user's vehicle in case that the vehicle will travel to the target objects practically. Then, the so calculated route distances are compared with each other to determine the substantially nearest target object to the user's vehicle at present. Thus owing to this route distance comparing function 212, a driver can set the driver's sights on the "substantially nearest" target object.

The necessary time comparing function 213 is a function to search the target object in consideration of the traffic congestion. Owing to the provision of the necessary time comparing function 213, a driver can set the driver's sights on the target object that can provide the shortest necessary time for the user's vehicle to reach the target object while reducing an influence of the traffic congestion as possible. The information about traffic congestion can be obtained by traffic information providing means, such as VICS (Vehicle Information and Communication System) based on FM multiple signals and beacon signals.

The search direction specifying function 214 is a function to search the target object in consideration of the traveling direction of the vehicle. Owing to the provision of the search direction specifying function 214, a driver can set the driver's sights on the target object along the traveling direction of the driver's vehicle, allowing it to be directed toward the target object without changing the vehicle's course.

Positional Relationship Analyzing Part

The positional relationship analyzing part 22 analyzes a positional relationship between one or more target objects detected by the searching part 21 and the user's vehicle. The analysis of the positional relationship means calculating a positional relationship (distance, direction) between the user's vehicle and the target thereby to convert the so calculated relationship into a numerical value. According to this embodiment, a distance between the user's vehicle and the target object is calculated by their latitude and longitude, obtaining the positional relationship on the coordinates between the user's vehicle and the target object. The details will be described in the paragraph of "operation".

Scale Calculating Part

Based on the positional relationship analyzed by the positional relationship analyzing part 22, the scale calculating part 23 calculates a reduced scale of the map information to be displayed on the onboard monitor 3 with reference to the display form (size, ratio of lengthwise to crosswise, margin) of the monitor 3. At this time, a layout editing function 231 edits the layouts of display image on judgments that how positional relationship the user's vehicle and the target object should be displayed on the onboard monitor 3 and how much the margin of the onboard monitor 3 should be ensured. For example, the positional relationship between the vehicle and the target object is displayed on an onboard monitor while allowing its upside to coincide with a north direction. Alternatively, the positional relationship may be displayed while allowing an upside of the onboard monitor to coincide with a vehicle's traveling direction. Further, the positional relationship may be displayed so that a linear distance between the vehicle and the target object has a maximum value on the monitor (both on a diagonal line of the monitor).

A map information pickup (cutout) function 232 is a function to determine a cutout area of the map information and further extract the applicable map information, on the basis of both edited layout and calculated scale.

Map Information Acquiring Part

The map information acquiring part 24 reads out the map information, which has been cut out by the scale calculating part 23, from the memory unit 6 and further displays the so readout map information on the onboard monitor 3.

Memory Unit

The memory unit 6 stores various information including the map information. Repeatedly, the unit 6 may be arranged on the side of the vehicle. Alternatively, it may be arranged in the map server to which a user gives access through the internet system. Stored in the memory unit 6 are a regional sort property information 611 that allows sorts of regions to correspond to the position of the user's vehicle, a road sort property information 612 that allows sorts of roads to correspond to the position of the user's vehicle, a target object positional information 613 that represents the target object's position, name, mark, feature, etc. and a traffic congestion information 62 that shows the situations about traffic congestion in respective routes. Because of real time information, the traffic congestion information has only to be stored temporarily.

This map information includes a latitude/longitude information on the map and an absolute position information employed in the navigation system receiving a radio wave transmitted from a position detecting satellite through the GPS antenna.

Operation of the Map Information Providing Apparatus

[First Operation]

Figure 4:
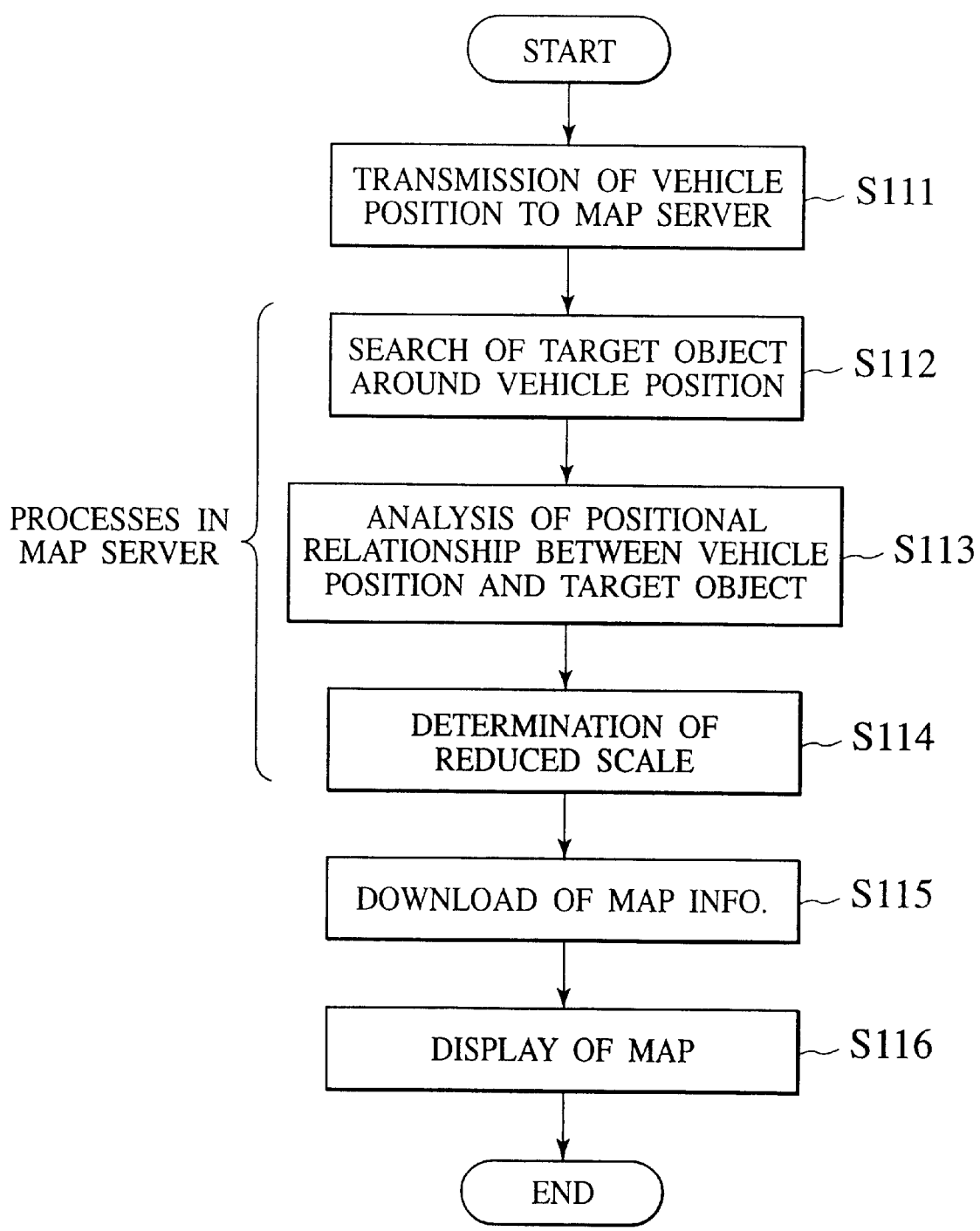
FIG. 4 is a flow chart showing the main operation of the map information providing apparatus of the first embodiment of the invention.

We now describe the first operation of the map information providing apparatus 1 of this embodiment with reference to FIG. 4.

When the map information demand button (switch) 11 on the "onboard" control unit 2 is pushed by the user, then the apparatus 1 obtains access to the map server 60 through the onboard communication terminal of the onboard unit 1 and the portable telephone base station 4 thereby to transmit the positional information Pc (Xc [degrees], Yc [degrees]) of the user's vehicle, which has been detected by the user's vehicle position detecting unit (or GPS unit) 13, to the map server 60 (step S111).

At step S112, on the basis of the positional information of the user's vehicle, the map server 60 searches the positional information about target objects in the neighborhood of the user's vehicle. As the target objects, repeatedly, there are interchanges in freeways, intersections with main roads, stations, institutions (e.g. city offices, kobans) and the other objects that the driver can recognize their positions.

Employed as a map data used in this embodiment are maps which are produced on the ground of numerical maps published by the Geographical Survey Institute in Japan. Using a primary mesh divided with angles of 0° in latitude direction and $\frac{2}{3}$° in longitude direction and a secondary mesh obtained by dividing the primary mesh into eight equal parts in both latitude and longitude directions, the numerical maps published by the Geographical Survey Institute are registered at every mesh divided with angles of 0° 05' (in latitude direction: corres. length of about 9,200 m) and 0° 07' 30" (in longitude direction: corres. length of about 18,000 m).

Figure 5:
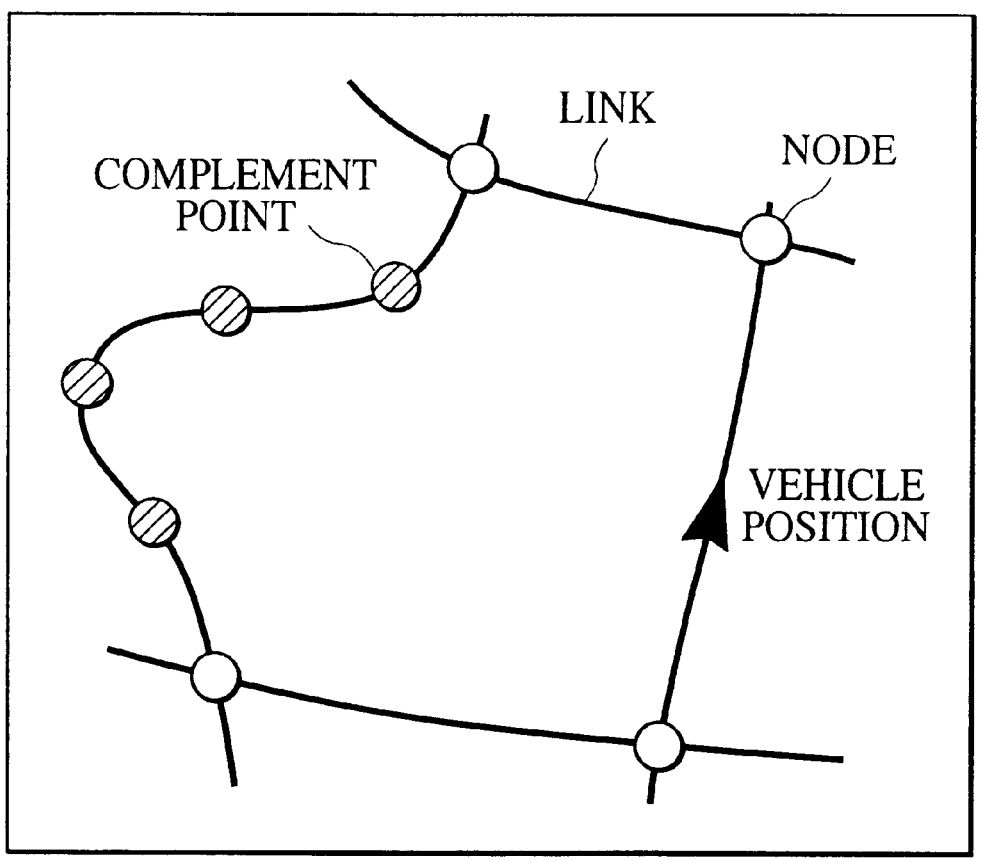
FIG. 5 is a view showing one example of a road data.

As illustrated in FIG. 5, the map data about roads is formed by nodes each recording the positional information of intersection, complement points each recording the coordinates on the road besides the intersections in order to express the profile of curves, and links each of which connects the nodes (or the complement points) to each other or connecting the node to the complement point and vice versa. The nodes, the complement points and the links are recorded with respective property data as to the sorts of roads. For example, the roads are classified into the road sorts about classification (freeway, main road, narrow street, introductory road for freeway, etc.). These constituents of the above classification are registered to all of nodes, complement points and links, as the property data. Note, as to stations, gas stations, restaurants and the other institutions, the property data of its position and sorts of institutions are registered respectively.

Figure 6:
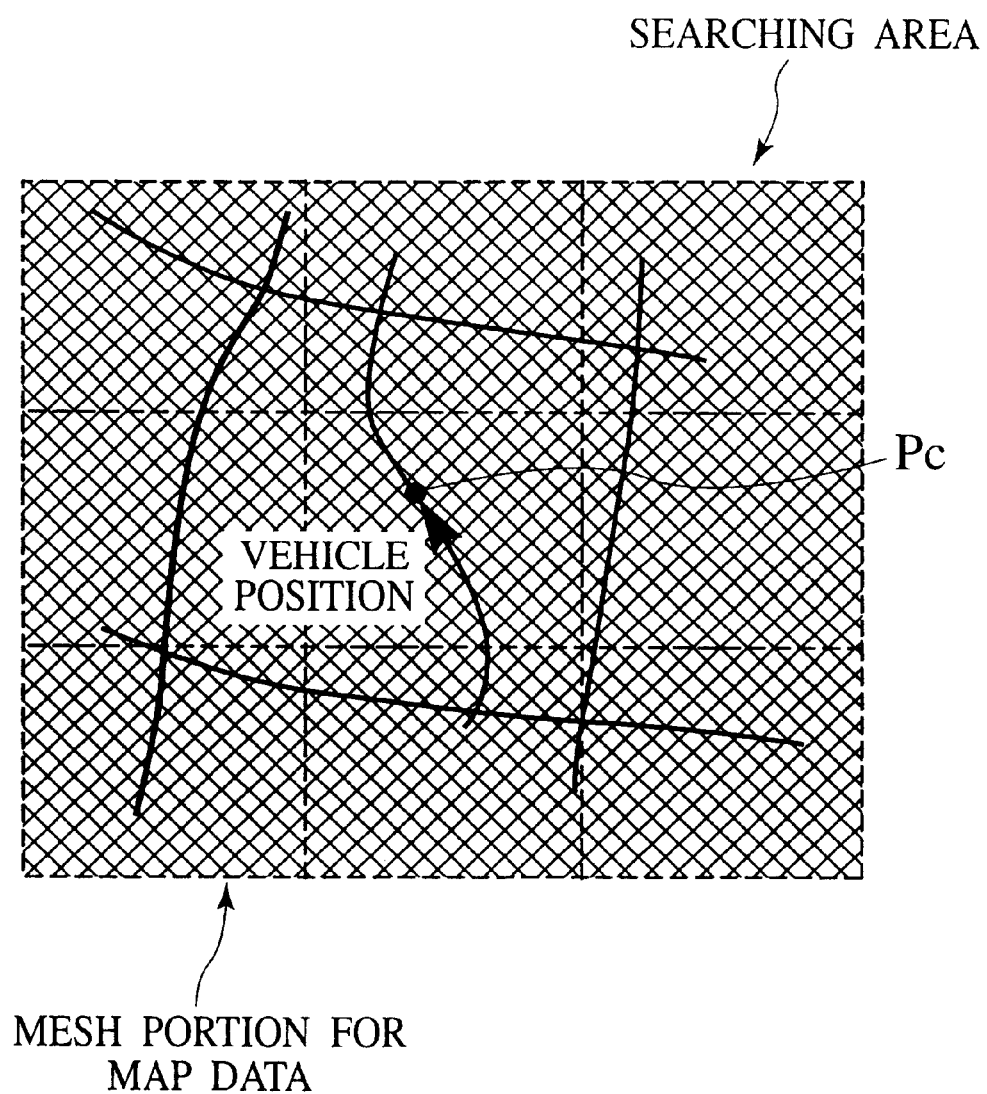
FIG. 6 is a view showing one example of an area for searching the position of a target object.

Referring to FIG. 6, we now describe the searching area for the target object. According to this embodiment, if the user's vehicle is present at a user's vehicle position Pc shown in the figure, then one mesh portion including the position Pc and eight mesh portions surrounding the above mesh portion are established as the searching area. For example, in case of an interchange for freeway as the target object, it is carried out to search a road, of which road property is nominated as "introductory road for freeway", within this searching area. Then, the searching result (i.e. introductory road) is temporarily stored in the memory unit 6, as "positional candidates" for target object.

At step S113, it is executed to search respective connection routes between a node (or complement point) adjacent to the user's vehicle position Pc and nodes forming the positional candidates (for example T1, T2 . . . Tn) obtained at step S112. Additionally, on the assumption that the vehicle might travel on the connection routes practically, it is executed to calculate a so called "course" distance for each of the so searched connection routes. Here, it is assumed that a positional candidate having the minimum course distance is represented by T (Xt [° ]; Yt [° ]).

Figure 7:
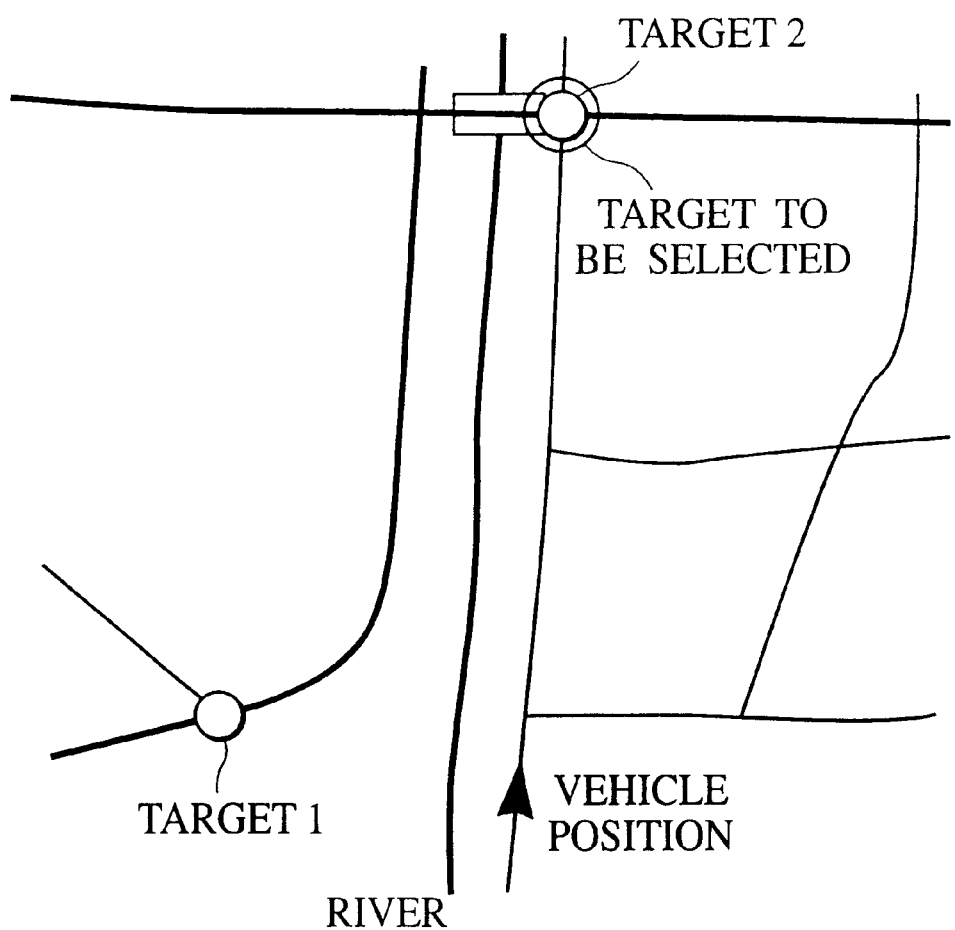
FIG. 7 is a view for explanation of an example of technique for selecting the target object.

The reason why the calculation is not directed to a linear distance but a course distance is as follows. In one example shown in FIG. 7, if there are provided, against the user's vehicle, two target objects (Target 1 and Target 2) as shown in the figure, then a linear distance between Target 1 and the user's vehicle becomes shorter than a linear distance between Target 2 and the user's vehicle. Nevertheless, since a river actually runs between the Target 1 and the user's vehicle, a "course" distance between Target 1 and the user's vehicle becomes longer than a "course" distance between Target 2 and the user's vehicle. Under such a situation, according to this embodiment, it is performed to select Target 2 having a shorter "course" distance rather than Target 1.

At step S114, it is carried out to obtain the maximum and minimum values (Ymax, Xmax; Ymin, Xmin) of latitude and longitude from various nodes (or complement points) on the route from the vehicle position Pc to the target object T. Further, by calculating respective differences between the maximum values and the minimum values, the reduced scale is determined as follows.

Dx=Xmax−Xmin

Dy=Ymax−Ymin

Upon representing the reduced scale by S (S1<S2<. . . <Sn), it is executed to refer a table where the respective scales are connected with the sizes of monitor images respectively. This table is stored in the memory unit 6.

S1: X1×Y1

S2: X2×Y2

S3: X3×Y3

.

.

.

S1: Xi×Yi

.

.

.

Sn: Xn×Yn

By referring this table, the reduced scale S is determined. It is noted that the size of map information to be displayed is Dx×Dy. Under the reduced scale Si, the size of image on monitor is Xi×Yi. In this embodiment, there is employed a condition where the relationships of Xi>Dx and Yi>Dy are satisfied while minimizing a value of (i).

With the establishment of the above condition, it is possible to display the whole course from the position Oc up to the Target T on one image with the minimum scale.

We now describe one example of calculating the reduced scale S. If there are established the following conditions of: Xmax=139° 22' 30"; Xmin=139° 15'; Ymax=35° 25' and Ymin=35° 20'. Then, there are obtained the relationships of Dx=0° 7' 30" and Dy=0° 5'. Next, the so calculated Dx, Dy are converted into values in the metric unit.

$$Dx=0.125° \times \{16733-N\times 104\times \tfrac{2}{3}+3\times (E-100)\}\times 8=14423\,[m]$$

Note, the terms N and E designate whole numbers of latitude and longitude, respectively. Therefore, in this example, "N" is equal to 35, while "E" is equal to 139.

$$Dy=0.0833° \times 110916=9243\,[m]$$

The above calculation results indicates that if only a monitor picture (map information) has a reduced scale allowing of displaying an area equal to or more than an area of 9243 [m] in latitude and 14423 [m] in longitude, then it is possible to display an overall route from the position of the user's vehicle to a position of the target object on the identical picture.

Figure 8A:
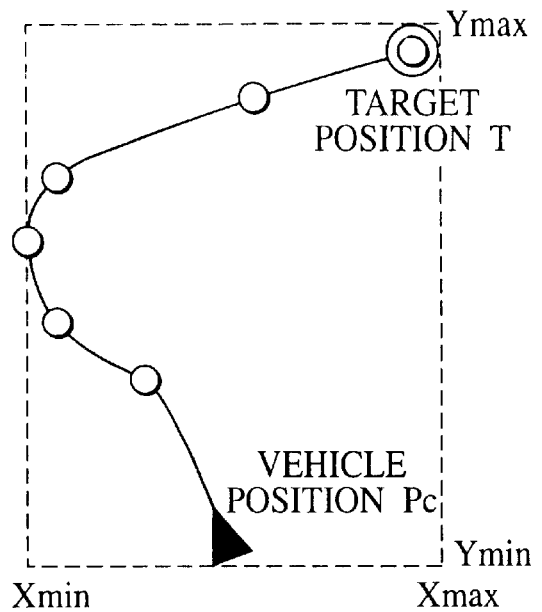
FIG. 8A is a view showing the first example of picking up a map information.
Figure 8B:
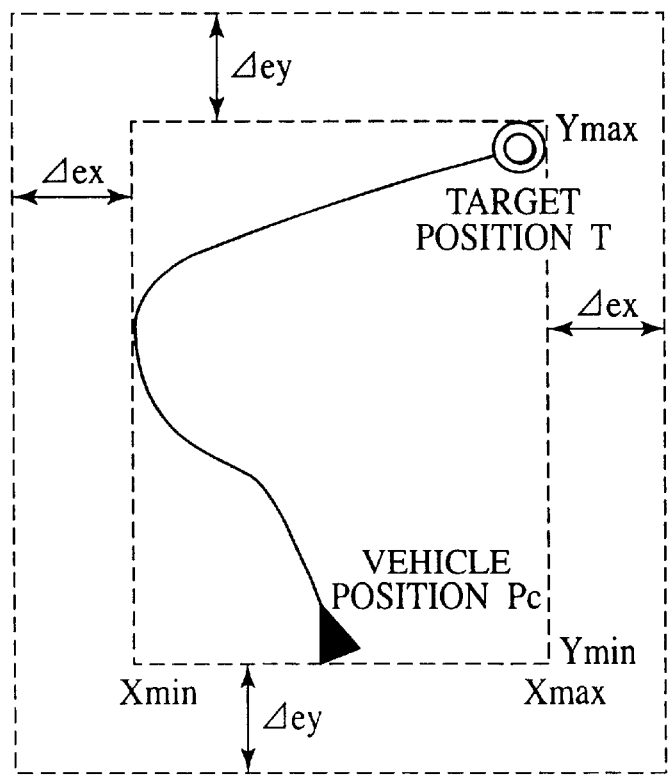
FIG. 8B is a view showing the second example of picking up another map information.

In consideration of easiness for a user to watch the map information on the monitor picture, it is desirable to select a reduced scale that allows respective margins more than predetermined widths to be ensured on all sides of the picture, as shown in FIG. 8B. As the value of margin on each side of the picture, for example, it may have a width of 5% of the picture size. Nevertheless, the value of margin should be appropriately determined corresponding to size, arrangement, etc. of the monitor picture. In this example, the relationships between the reduced scales and the corresponding actual sizes of the map information to be displayed on the monitor are as follows.

1/6,250: 120×75 [m]

1/12,500: 240×150 [m]

1/25,000: 480×300 [m]

1/50,000: 960×600 [m]

1/100,000: 1920×1200 [m]

1/200,000: 3840×2400 [m]

1/400,000: 7680×4800 [m]

1/800,000: 15360×9600 [m]

1/1,600,000: 30720×19200 [m]

1/3,200,000: 61440×38400 [m]

In accordance with the above relationships, as the minimum reduced scale allowing the above calculated area (14423×9243 [m]) to be accommodated in the monitor, there might be selected the scale of 1/800,000 because of its corresponding actual size (15360×9600 [m]). While, if ensuring 5% margins (768[m]=15360×0.05) on all sides of the map information, then an image length required in the direction of X axis amounts to 15959 [m] (=14423+768×2) which exceeds the above actual size (15360[m]). In such a case, the reduced scale is shifted to a larger one, that is, the scale of 1/1,600,000.

At step S115, by the map information pickup (cutout) function 232 of the reduced scale calculating part 23, it is executed to establish a cutout area of the map information that involves the whole route from the present position Pc of the user's vehicle to the target object T at the reduced scale S calculated at step S114 and also equalizes the upper/lower and left/right margins Δey, Δex with each other, as shown in FIG. 8B. Additionally, the map information acquiring part 24 operates so that the positional data of nodes, complement points, links and institutions (e.g. station, gas station, general store) is loaded (downloaded) into the map information providing apparatus 1 through the onboard communication terminal (not shown) or the portable telephone terminal 14.

In case of applying respective values at step S114 to Ymax, Xmax, Ymin, and Xmin, the left/right margins amount to 8150 [m] respectively. This length corresponds to 0° 4' 14" in conversion to angle. Similarly, the upper/lower margins amount to 4980 [m] respectively. This length corresponds to 0° 2' 42" in conversion to angle. Therefore, an upper point on the right side of the picture is situated at lat. 35° 27' 42" North and long. 139° 26' 44" East.

At step S116, it is carried out to specify the present position of the user's vehicle in the map information loaded at step S115 and further display the completed map information on the display unit 3.

Figure 9:
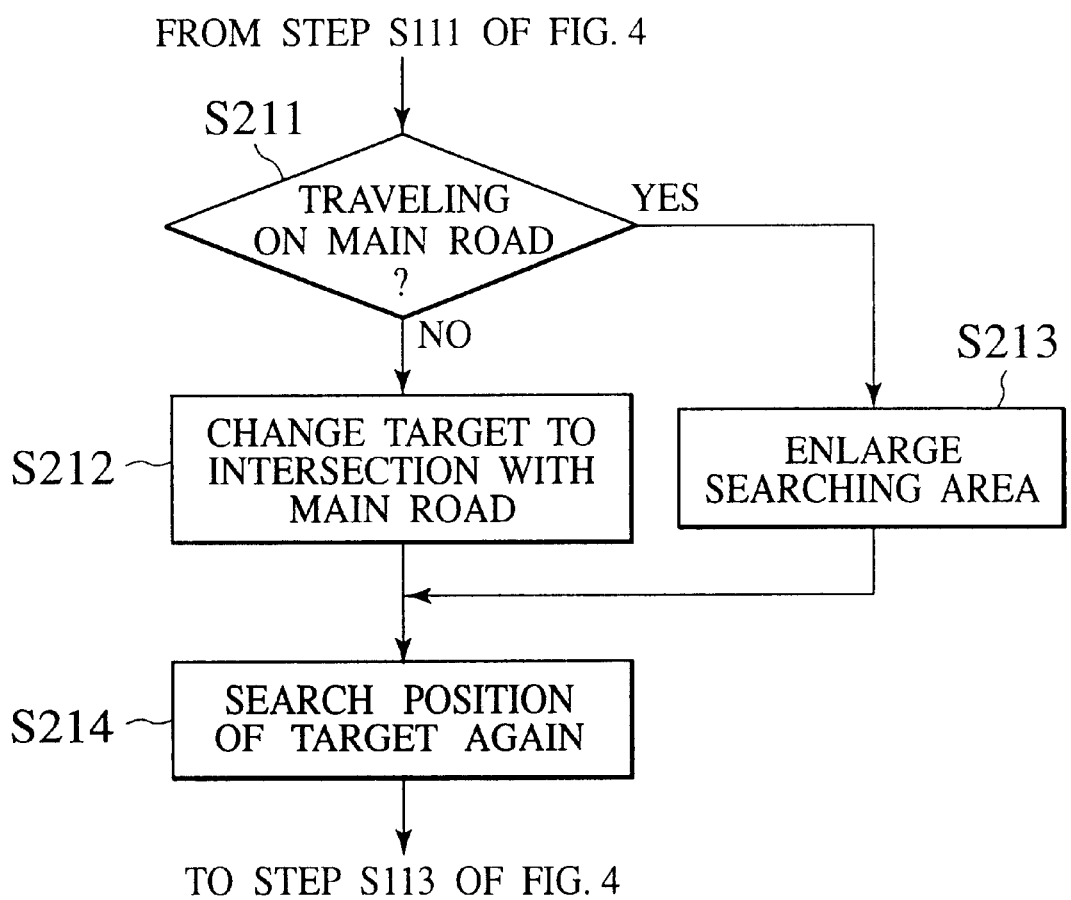
FIG. 9 is a flow chart showing the main operation of the map information providing apparatus of the second embodiment of the invention.

FIG. 9 is a flow chart for explanation of the operation to be executed when no target object has been specified within the searching area of FIG. 6 at step S112. At step S211, it is judged whether the user's vehicle is traveling on a main road or not. If the target object (i.e. destination for the moment) is set to an interchange for freeway and a link closest to the present position of the user's vehicle is judged as "national road", it is judged that the user's vehicle is traveling on the main road and then the routine goes to step S213 to enlarge the searching area. While, if the user's vehicle is traveling on any road besides the main road (No at step S211), the routine goes to step S212 to change the target object to an intersection of the road with a main road. In the modification, the judgement at step S211 whether or not the user's vehicle is traveling on the main road may be carried out on the ground of the number of traffic lanes. For example, if it is judged that the vehicle is traveling on a four or more lane road, it may be regarded that the vehicle is now traveling on the main road although the link closest to the present position of the user's vehicle is not a national road.

After executing a process at step S212 to alter the target object, the routine goes to step S214 to search the target object in the searching area shown in FIG. 6, again.

At step S213, the searching area for the target object is enlarged to mesh portions outside the searching area shown in FIG. 6 and the routine goes to step S214 to search an interchange for freeway in the so enlarged searching area again.

After executing the process at step 214, the routine goes to step S113 of FIG. 4.

[2nd. Embodiment]

Next, we describe the second embodiment of the present invention. In the second embodiment, the constitution of the map information providing apparatus is similar to that of the first embodiment. As to the operation, the map information providing apparatus of the embodiment is provided with additional functions as follows. In acquiring the map information corresponding to the present position of the user's vehicle, the search area establishing function 211 of the searching part 21 serves to select the target object in accordance with the sorts of roads. One example is shown in Table 1.

TABLE 1

| Road Property of Position of Vehicle | Target Object |
| --- | --- |
| narrow street | intersection with main local road or national rod |
| main local road | interchange on freeway |
| national road | interchange on freeway |
| freeway | the fifth interchange ahead |

Note, the positional relationship between the target object to be selected and the user's vehicle is not limited to the relationship in Table 1 only. For example, the target object may be selected corresponding to the property of region including the position of the user's vehicle. In connection, a table between the target object and the regions may be provided by the above Table 1. For example, if the user's vehicle is in one of cities designated by a government, an interchange on freeway is designated as the target object. Further, if the user's vehicle is positioned in one of general town/city boundaries or one of rural districts, an intersection with a main local road or a national rod may be designated as the target object. In this way, a correspondence between property constituents and the target objects may be established freely.

In Table 1, it is established that when the user's vehicle is positioned in the narrow street, an intersection with the main local road or the national road is determined as the target object for the moment. Consequently, if the user misses the user's way in the narrow streets, then a map for introducing the vehicle to a main road in the neighborhood is provided, whereby the vehicle can be guided to the main road smoothly. Further, it is established that when the user's vehicle is positioned in the main local road, an interchange for freeway is determined as the target object for the moment. Consequently, even if the vehicle is traveling on a main road that the user passes for the first time, the user can easily grasp which direction the user's vehicle is traveling to.

Regarding the control of the apparatus to execute the above mentioned operations, the flow chart shown in FIG. 4 is applicable to this embodiment, provided that it is executed at step S112 to select the target object by the road sort of the nearest link to the user's vehicle and also Table 1. The operations at the other steps are similar to those of the first embodiment.

[3rd. Embodiment]

The third embodiment of the invention will be described below. The third embodiment is similar to the first embodiment except that the apparatus 1 is equipped with a receiving function to receive a traffic information produced from an exterior VICS system.

Figure 10A:
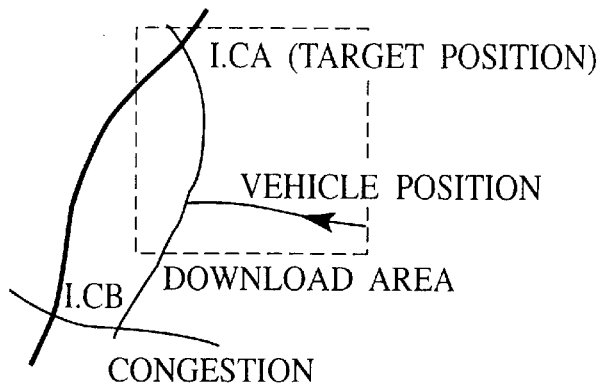
FIG. 10A is a view showing the first example of selecting a target object.
Figure 10B:
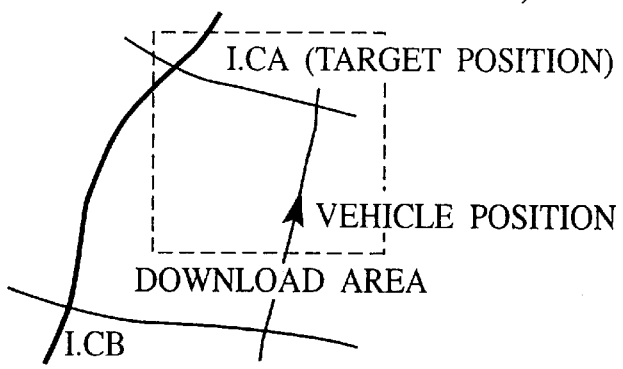
FIG. 10B is a view showing the second example of selecting the target object.
Figure 10C:
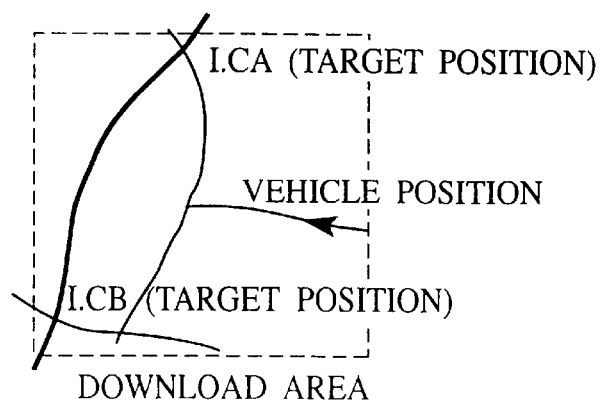
FIG. 10C is a view showing the third example of selecting the target object.

As to the operation, the map information providing apparatus of the embodiment is provided with additional functions as follows. In acquiring the map information corresponding to the present position of the user's vehicle, the functions of the embodiment take effect when there are detected two or more target objects that their respective "route" distances from the present position of the user's vehicle are similar to each other. FIGS. 10A, 10B and 10C illustrate various situations where two or more target objects are detected.

FIG. 10A shows a case that there are detected two target objects that congesting conditions in routes from the present position to the target objects are different from each other in spite of their similar route distances. In this case, the necessary time comparing function 213 of the searching part 21 serves to select a target object that the route from the present position of the user's vehicle to the target object has no or less traffic congestion. Consequently, the user can select a target object that requires less period for the vehicle to reach a target object for the moment (e.g. freeway), allowing the vehicle to reach the user's final destination early. According to the embodiment, in consideration of the reasons, degrees, etc. of traffic congestion, it is executed to convert the respective traffic congestion into respective times required for the user's vehicle to reach the target objects. Then, it is executed to compare the converted necessary times with each other, thereby selecting the only one target object. Note, the information about traffic congestion may be obtained through a traffic information providing system, such as VICS.

FIG. 10B shows a case that there are detected two target objects that are different from each other in terms of the relationship between the traveling direction of the user's vehicle and the target objects while the target objects are similar to each other in terms of the route distance. In this case, the searching direction specifying function 214 of the searching part 21 serves to select a target object that is positioned in a direction along the vehicle's traveling direction. Consequently, the driver (user) can reach the target object without changing the traveling direction, allowing the vehicle to reach the user's destination smoothly. In the modification, the necessary time comparing function 213 may be activated while taking precedence over the searching direction specifying function 214. That is, it may be adopted that if there is a traffic congestion in the course for one target object, the other target object having no traffic congestion is selected. Further, when there is no traffic congestion on respective routes for the target objects, the target object along he vehicle's traveling direction may be selected.

FIG. 10C shows a case that there are detected a plurality of target objects under situation that the target objects are similar to each other in terms of the route distance and there is no traffic congestion on their respective route. In this case, it is executed to select all the target objects and further display them on the identical picture, together with the user's vehicle. In other words, it is executed to calculate a reduced scale of map allowing all the item (target objects and vehicle) to be displayed on the identical picture. Consequently, the driver can pick up the target object that is easy to reach because of neither traffic congestion nor turning in a different direction.

In order to accomplish the above mentioned operations, the flow chart shown in FIG. 4 is applicable to the apparatus of this embodiment, except for the following operation. That is, if a plurality of target objects that respective route distances are similar to each other are detected at step S113, it is executed not to select a target object that includes a traffic congestion in the corresponding route. When all the target objects include the traffic congestion in the corresponding routes, it is executed to select a target object whose degree of congestion is minimum, for example, a target object enabling the user to reach the object for the shortest necessary time. Next, if a plurality of target objects having no traffic congestion on the corresponding routes from the vehicle to the objects are detected, it is carried out to select a target object arranged in a position along the vehicle's traveling direction (in a position that does not require turning the traveling direction). Further, if a plurality of target objects are arranged in their positions along the traveling direction or they are arranged in their positions different from the traveling direction, all the detected target objects are employed as the formal target objects for the moment.

As mentioned above, according to the invention, since the display unit (LCD, onboard monitor, etc.) displays the map information with a reduced scale in consideration of the positional relationship between a user's vehicle and a target object, a user (driver, passenger on vehicle, etc.) can grasp the driver the positional relationship therebetween precisely and quickly.

Finally, it will be understood by those skilled in the art that the foregoing descriptions are nothing but some embodiments of the disclosed map information providing apparatus and method. Besides these embodiments, various changes and modifications may be made to the present invention without departing from the spirit and scope of the invention.

Japanese Patent Application Serial No. 2001-82420 filed on Mar. 22, 2001, is expressly incorporated herein by reference in its entirety.

The scope of the invention is defined with reference to the following claims.

What is claimed is:

1. A map information providing apparatus comprising:
    a detecting unit configured to detect a position of a user's vehicle;
    a memory unit configured to store information including a map information therein;
    a control unit connected to the detecting unit and communicated with the memory unit thereby to select the map information in the circumferences of the position of the user's vehicle detected by the detecting unit; and
    an onboard display unit connected to the control unit and configured to display the map information selected by the control unit; wherein
    the map information includes information about target objects forming landmarks on a route for a user's destination; and
    the control unit comprises:
        a searching part configured to search a target object for the moment with reference to the information stored in the memory unit, on the basis of the position of the user's vehicle and information about the user's destination inputted by a user;
        a positional relationship analyzing part connected to the searching part and configured to analyze a positional relationship between the target object searched by the searching part and the user's vehicle;
        a reduced scale calculating part connected to the positional relationship analyzing part and configured to calculate a reduced scale of the map information to be displayed on the onboard display unit, on the basis of the positional relationship analyzed by the positional relationship analyzing part and a display format of the onboard display unit; and
        a map information acquiring part connected with both of the reduced scale calculating part and the onboard display unit and configured to acquire the map information with the reduced scale calculated by the reduced scale calculating part, from the memory unit and further transmit the map information to the onboard display unit.

2. The map information providing apparatus of claim 1, wherein
    the reduced scale calculating part is provided with a layout edit function which edits a layout of the map information to be displayed on the onboard display unit.

3. The map information providing apparatus of claim 2, wherein
    the layout edit function of the reduced scale calculating part is to edit the layout of the map information so as to allow the target object and the position of the user's vehicle to be displayed on the onboard display unit simultaneously.

4. The map information providing apparatus of claim 1, wherein
    the memory unit is arranged in a server that the control unit is capable of access through an internet system.

5. The map information providing apparatus of claim 1, wherein
    the map information stored in the memory unit contains a regional property information designating a regional property as to which of urban part and rural part an objective area to be searched does belong to; and
    the searching part selects the target object for the moment corresponding to the regional property of a region where the user's vehicle is present.

6. The map information providing apparatus of claim 1, wherein
    the map information stored in the memory unit contains a road property information such as a freeway, main road and narrow street with respect to an objective route to be searched; and the searching part selects the target object for the moment corresponding to a road property of a load where the user's vehicle travels.

7. The map information providing apparatus of claim 1, wherein the map information stored in the memory unit contains a traffic congestion information designating a congestion situation of an objective route to be searched; and the searching part selects the target object corresponding to the congestion situation of a route where the user's vehicle travels.

8. The map information providing apparatus of claim 1, wherein the detecting unit has a function to detect a traveling direction of the user's vehicle; and the searching part has a function to specify a direction of a searching area for searching the map information in accordance with the traveling direction of the user's vehicle.

9. The map information providing apparatus of claim 1, wherein the positional relationship analyzing part has a function to calculate respective route distances between the position of the user's vehicle and the target objects and further compare the calculated route distances with each other.

10. A map information providing apparatus comprising:

detecting means for detecting a position of a user's vehicle;

memorizing means for storing information including a map information therein;

control means for selecting the map information in the circumferences of the position of the user's vehicle detected by the detecting means; and onboard display means for displaying the map information selected by the control means; wherein the map information includes information about target objects forming landmarks on a route for a user's destination; and the control means comprises:

a searching part configured to search a target object for the moment with reference to the information stored in the memorizing means, on the basis of the position of the user's vehicle and information about the user's destination inputted by a user;

a positional relationship analyzing part connected to the searching part and configured to analyze a positional relationship between the target object searched by the searching part and the user's vehicle;

a reduced scale calculating part connected to the positional relationship analyzing part and configured to calculate a reduced scale of the map information to be displayed on the onboard display means, on the basis of the positional relationship analyzed by the positional relationship analyzing part and a display format of the onboard display means; and a map information acquiring part connected with both of the reduced scale calculating part and the onboard display means and configured to acquire the map information with the reduced scale calculated by the reduced scale calculating part, from the memorizing means and further transmit the map information to the onboard display means.

11. A map information providing method for selecting a map information on the circumstances of a position of a user's vehicle in response to a map information demanding order received from a terminal on the user's vehicle, thereby to display the selected map information on an onboard display unit, the method comprising:

storing a map information including target objects forming landmarks on a route for a destination in advance;

searching a target object for the moment out of the target objects with reference to the map information on the basis of the position of the user's vehicle and information about the destination inputted by a user;

analyzing a positional relationship between the searched target object and the user's vehicle;

calculating a reduced scale of the map information to be displayed on the onboard display unit, on the basis of the analyzed positional relationship and a display format of the onboard display unit; and selecting the map information in accordance with the calculated reduced scale and further transmitting the readout map information to the user's vehicle.

12. The map information providing method of claim 11, further comprising:

editing a layout of the map information to be displayed on the onboard display unit in advance of calculating the reduced scale.

13. The map information providing method of claim 12, wherein the edited map information has a layout allowing a position of the target object and the present position of the user's vehicle to be displayed on the onboard display unit simultaneously.

* * * * *